(No Model.)
W. R. JOHNS.
PULLEY.
No. 370,017.  Patented Sept. 13, 1887.
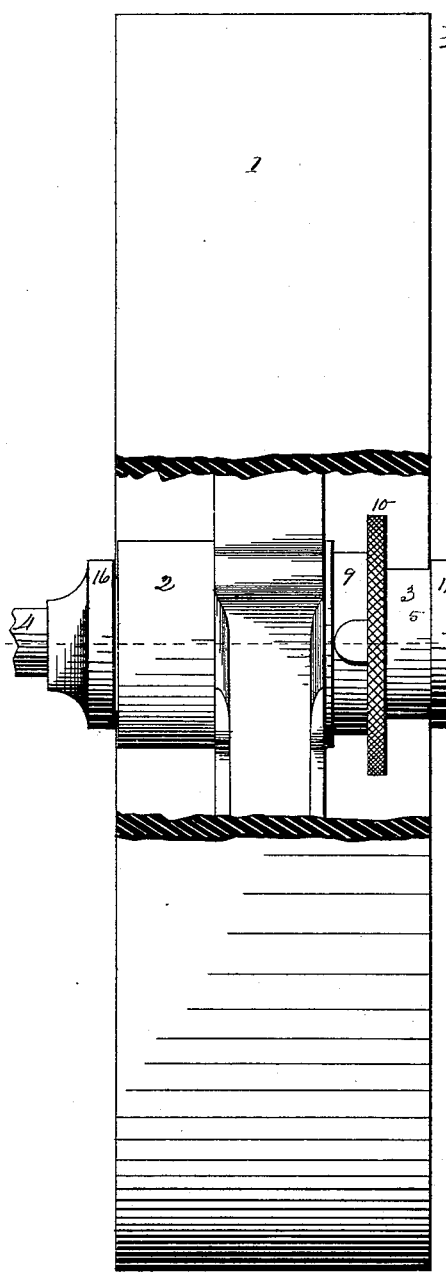
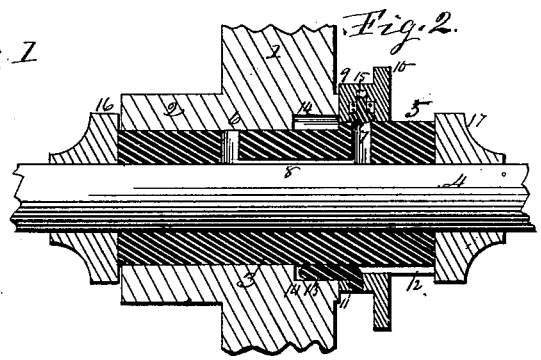
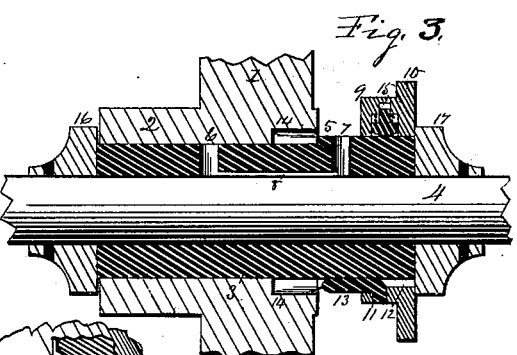
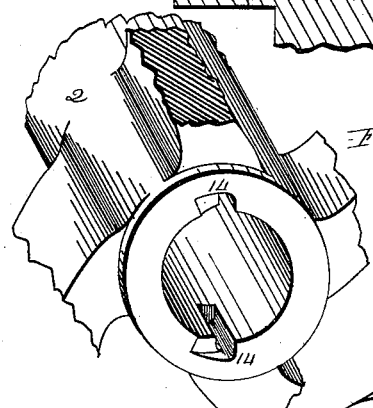
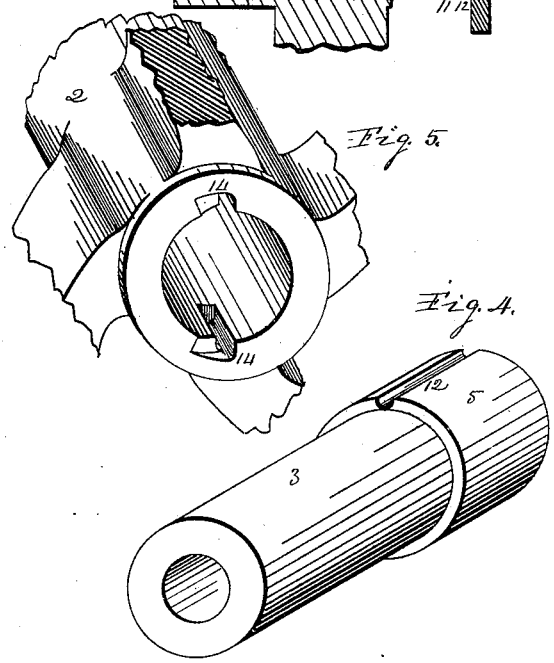
Witnesses.
E. Behel.
A. O. Behel
Inventor.
Will. R. Johns,
Per Jacob Behel
Atty.

UNITED STATES PATENT OFFICE.

WILL R. JOHNS, OF ROCKFORD, ILLINOIS, ASSIGNOR OF ONE-HALF TO HOWARD E. HARBAUGH, OF SAME PLACE.

PULLEY.

SPECIFICATION forming part of Letters Patent No. 370,017, dated September 13, 1887.

Application filed April 21, 1887. Serial No. 235,701. (No model.)

*To all whom it may concern:*

Be it known that I, WILL R. JOHNS, a citizen of the United States, residing in the city of Rockford, county of Winnebago, and State of Illinois, have invented certain new and useful Improvements in Pulleys, of which the following is a specification.

This invention relates to a class of pulleys or gear-wheels, known as "loose" pulleys or wheels, employed in machinery for the transmission of power. Its object is to provide a ready means of oiling the bearing-surfaces of this class of pulleys or wheels to reduce friction and prevent cutting of their bearing-surfaces. To this end I have designed and constructed the apparatus represented in the accompanying drawings, and which will be hereinafter more fully described.

In the drawings, Figure 1 is an edge view elevation of a pulley embodying my invention, in which a portion of the rim is broken away to show the hub portion. Fig. 2 is a central section lengthwise of the shaft-support of the pulley on dotted line *a* on Fig. 1, with the parts in their working position. Fig. 3 is also a central section lengthwise of the shaft-support of the pulley on dotted line *a* on Fig. 1, with the parts in position to be oiled. Fig. 4 is an isometrical representation of the thimble portion of the hub of the pulley, and Fig. 5 is an isometrical representation of the end face of the hub of the pulley.

The pulley 1 (represented in the accompanying drawings) is in the main substantially identical with pulleys in every-day use. The hub 2 of the pulley 1 is bored in the axial center of the pulley to receive a thimble, 3, in a manner to permit the pulley to revolve thereon. The thimble 3 is bored in its axial center to receive the main shaft 4, on which it revolves.

The thimble 3 is of greater length than the hub of the pulley, and its projecting end portion, 5, is of greater diameter than the axial bore of the hub, forming a shoulder to engage the hub end to fix its position in the hub of the pulley. This thimble 3 is provided with a radial oil-hole, 6, extending through the annular wall of the thimble within the hub of the pulley, and also a radial oil-hole, 7, extending through the annular wall of the thimble in its enlarged projecting end portion; and a channel or groove, 8, in the inner face of the thimble connects the oil-holes 6 and 7.

A clutch-collar, 9, with end thumb-flange, 10, projecting from its outer end, is of proper dimensions to receive the enlarged end portion, 5, of the thimble to slide endwise snugly thereon. This clutch-collar is provided on its inner face with a semicircular axial groove meeting a radial hole, 11, extending through the annular wall of the collar. This semicircular groove in the collar corresponds to a like groove, 12, formed in the enlarged end portion of the thimble.

A feather, 13, of cylindrical pin form in section to freely enter the semicircular grooves in the thimble and clutch-collar, is formed with a hook end to enter the radial hole 11 at the inner end of the semicircular groove in the clutch-collar, and when in place and the clutch-collar in place on the thimble serves to connect the clutch-collar and thimble, to cause them to revolve together and permit an endwise sliding movement of the collar on the thimble.

The end portion of the feather 13 projects beyond the end of the clutch-collar, and is designed to enter a hole or one of the holes 14, formed in the end of the hub of the pulley, when the collar is shoved in contact with the hub, and serves as a clutch to connect the pulley and thimble, to cause them to rotate together and permit independent action when separated.

The outer ends of the holes 14 on the outer end face of the hub are formed with an incline on the side of the hole in the direction of the movement of the pulley, to permit the free entrance of the feather when the collar is shoved to engage the end of the hub.

In the hub of the pulley, as shown at Fig. 5, the inclines are on the opposite sides of the holes 14, to permit the free entrance of the feather to one of the holes, whether the pulley is moving in one or the other direction.

A spring-actuated stud, 15, is placed in a radial hole formed in the inner surface of the clutch-collar 9 in position to enter and cover the oil-hole 7 in the enlarged portion of the thimble within the end of the hub of the pulley, as shown in Fig. 2, to prevent the oil being thrown from the hole when the pulley is running.

The spring-actuated stud 15 is of such construction that a reasonable force exerted outward on the thumb-flange will carry it from contact with the oil-hole and will carry the clutch-collar to the position shown in Fig. 3.

In the drawings I have represented a collar, 16, fixed to the shaft; but in practice, when a fixed and loose pulley are employed, a pulley will be employed instead of the collar, and will be fixed in place on the shaft to revolve therewith. The thimble 3, the pulley 1, and the clutch-collar 9, with its feather and spring-actuated stud, are then put in place on the shaft against the fixed pulley employed instead of the collar 16, and a collar, 17, is then fixed in place on the shaft to hold the loose pulley in place thereon.

To oil the loose pulley in its connections with the parts, the clutch-collar 9, by means of its thumb-flange 10, is drawn outward from contact with the hub of the pulley to the position shown in Fig. 3, in which position it will be disengaged from the pulley, which will then be free to revolve on the thimble and the thimble and clutch-collar will be at rest, and the outward movement of the clutch-collar will expose the oil-hole 7, into which oil can be poured to fill the holes and channel or groove connecting them, after which the clutch-collar can be shoved inward to connect the parts and cover the oil-hole, as shown in Fig. 2.

In the foregoing I have represented my improvements in connection with a loose pulley, to which purpose it is especially adapted; but instead of the pulley a gear-wheel may be employed. It is also adapted for use in connection with what is known as "clutch-pulley," and is capable of use in connection with, perhaps, all varieties of pulleys or wheels loosely mounted on their shaft-supports.

I claim as my invention—

1. The combination of a wheel, a thimble within the hub of the wheel, and a clutch-collar to connect the thimble with the wheel or disconnect it therefrom, substantially as and for the purpose set forth.

2. The combination of a wheel, a thimble within the hub of the wheel, a clutch-collar on the thimble, and a feather-connection of the clutch-collar with the thimble, said clutch-collar capable of an axial sliding movement in its feather-connection with the thimble to connect or disconnect the wheel and thimble, substantially as and for the purpose set forth.

3. The combination of a wheel, a thimble within the hub of the wheel, a clutch-collar on the thimble, and a spring-actuated stud within the clutch-collar to engage the oil-hole in the thimble, substantially as and for the purpose set forth.

WILL R. JOHNS.

Witnesses:
JACOB BEHEL
A. O. BEHEL.